United States Patent Office 3,245,969
Patented Apr. 12, 1966

3,245,969
SOLID POLY(ALLYL CHLORIDE)
Frederick P. Reding, Charleston, Edgar W. Wise, South Charleston, and Edward M. Sullivan, Charleston, W. Va., assignors to Union Carbide Corporation, a corporation of New York
No Drawing. Filed Jan. 30, 1961, Ser. No. 85,481
8 Claims. (Cl. 260—91.7)

The present invention is concerned with a process for the free-radical catalyzed polymerization of allyl chloride whereby novel, solid, high-molecular weight poly (alllyl choride) products are obtained.

It has heretofore been known that certain allyl compounds such as allyl halides polymerize only with difficulty, yielding liquid homopolymeric products of low molecular weight. It is also known that the presence of such allyl monomers often tends to retard both the rate and degree of polymerization in reactions in which other copolymerizable monomers are also involved. Attention is drawn in this connection to the publications "Allyl Polymerizations," R. C. Liable, Chem. Rev., 58, 807 (1958), and "Vinyl and Related Polymers," Schildknecht, J. Wiley & Sons, 391 and 411 (1952). As indicated in these publications, the major difference between allyl polymerizations and other types of polymerization, such for instance, as those involving vinyl monomers, is attributable to the role played by chain-transfer, especially degradative chain-transfer, during allyl polymerizations, particularly when free-radical polymerization catalysts are employed.

By way of illustration, in addition to conventional chain-initiation, chain-propagation and chain-termination, another type of chain-transfer reaction that can occur during the polymerization of allyl chloride involves both the allyl chloride monomer and a free-radical formed either from the active growing polymer chain or from the free-radical polymerization catalyst when employed, and entails the loss of a hydrogen atom or a chlorine atom to the free-radical by the allyl chloride monomer. The monomer free-radical thus produced, i.e. $CH_2=CHCH_2$ or $CH_2=CHCHCl$, is stabilized by resonance as indicated by Equations 1 and 2 below, which in effect also makes the abstraction and transfer of the hydrogen atom or chlorine atom easier.

(1) 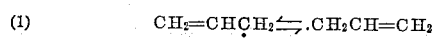

(2) 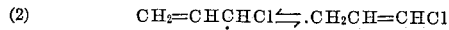

Consequently, the monomer free-radical is less reactive, that is to say, has less of a tendency to initiate a new polymer chain. At the same time, the gain of a hydrogen atom or a chlorine atom by the growing polymer chain terminates the chain. Such a chain-transfer reaction, therefore, is virtually and essentially a termination reaction and, accordingly, has come to be referred to in the polymer art as "degradative chain-transfer."

In the light of this knowledge, it is believed that prior efforts to produce high-molecular weight allyl polymers, and particularly allyl chloride homopolymers, have heretofore been unrewarded to a large extent due to degradative chain-transfer. It is also believed that degradative chain-transfer is responsible for the large amounts of free-radical polymerization catalyst often required in conventional allyl polymerizations, e.g. amounts of about 2 mole percent or more based upon the monomer, since growing polymer chains are thereby terminated after only relatively few monomer units have been added. The allyl chloride homopolymers heretofore obtained by prior art polymerization processes, for example, have ordinarily been relatively low-molecular weight, liquid polymers.

Unexpectedly, it has now been found that allyl chloride can be polymerized via polymerization reactions in which chain-propagation is highly favored over degradative chain-transfer so as to obtain as products solid, high-molecular weight allyl chloride homopolymers. More particularly, the present invention depends upon the finding that solid, high-molecular weight allyl chloride homopolymers can be produced by polymerizing allyl chloride in contact with a catalytic amount of a free-radical polymerization catalyst at high pressures of at least about 15,000 pounds per square inch. The solid allyl chloride homopolymers of this invention thus obtained can, in turn, be employed to produce elastomeric films, protective coatings, moldings, laminates, lacquers and the like, such articles being characterized by having a high degree of flame- or fire-resistance, and are useful, for example, in many fire-proofing operations.

Unlike the low-molecular weight, liquid allyl chloride homopolymers known to the art, the poly(allyl chloride) products produced by the process of this invention are solid, high-molecular weight homopolymers having a relative viscosity of at least 1.01, and generally in the range of from about 1.02 to about 1.1 to 1.2 or slightly higher. The term "relative viscosity" is well known in the polymer art and designates the value obtained by dividing the viscosity of a solution of the polymer by the viscosity of the pure solvent, as derived, for instance, from the following equation:

$$\text{Relative viscosity} = C_sT_s/C_oT_o$$

wherein $C_s$ is the density of the polymer solution, $C_o$ is the density of the pure solvent, $T_s$ is the efflux time of the polymer solution and $T_o$ is the efflux time of the pure solvent, the efflux time being measured, for example, using an Ubbelohde viscometer. Moreover, in all instances, the relative viscosities described herein and in the appended claims define the values obtained from measurements using, as the polymer solution, a 0.2 percent by weight solution of the polymer in cyclohexanone, and determined at a temperature of 30° C. Thus derived, the relative viscosity of a polymer is regarded as a direct measure of the molecular weight of the polymer with a higher relative viscosity value indicating a higher molecular weight for the polymer.

In an embodiment of the process of this invention, allyl chloride and a free-radical polymerization catalyst are brought into intimate contact at a pressure and temperature within the ranges herein prescribed. The polymerization catalysts which are suitable for use in the process of this invention are the conventional free-radical catalysts commonly employed in addition polymerization reactions. Thus, the term "free-radical polymerization catalyst" is used herein to refer to compounds which contain —O—O or —N=N— structural linkages, or are capable of forming these linkages by the action of dilute inorganic acids, or which otherwise produce free-radicals in situ during the polymerization reaction. As suitable catalysts, one can employ, for example, oxygen; hydrogen peroxide; acyl or aroyl peroxides such as benzoyl peroxide, acetyl peroxide, lauroyl peroxide, tertiarybutyl hydroperoxide, ditertiarybutyl peroxide, dibenzoyl peroxide, methyl benzoyl peroxide, acetyl benzoyl peroxide, peracetic acid, etc.; alkali metal persulfates such as sodium- and potassium persulfate, etc.; alkali metal- and ammonium perborates and percarbonates; alkyl percarbonates such as isopropyl percarbonate and butyl percarbonate, etc.; azo compounds such as azobisisobutyronitrile, azobis(dimethylvaleronitrile), dimethyl azobisisobutyrate azobisisobutyramide, etc.; trialkylborons such as tributylboron and trioctylboron, etc. and the like.

The concentration of the free-radical polymerization catalyst that is employed in the process of this invention can vary broadly in the range of from about 0.01 mole percent to about 1 mole percent of catalyst based upon the allyl chloride monomer, that is to say, from about 0.01 mole to about 1 mole of catalyst per 100 moles of monomer, with catalytic amounts below or above this range also being suitable for use. However, little additional advantage, if any, may accrue from the use of catalyst concentrations in excess of this range, while the rate of polymerization may rapidly decrease when lesser catalytic concentrations are employed. The preferred catalyst concentration is from about 0.1 mole percent to about 0.5 mole percent of catalyst based upon the monomer. Such amounts of catalyst, it is to be noted, are generally below those ordinarily employed in allyl polymerizations. This advantage is attributable to the fact that, as hereinabove described, chain-propagation is highly favored over degradative chain-transfer in the process of this invention.

The pressure employed in the polymerization process of this invention is of salient importance thereto, and should be at least about 15,000 pounds per square inch if chain-propagation is to be highly favored over degradative chain-transfer during the reaction, as is required for the production of the solid, high-molecular weight allyl chloride homopolymers of this invention. The maximum pressure which can be employed is restricted solely by the limitations imposed by the equipment utilized. Hence, pressures of from about 15,000 pounds per square inch to about 125,000 pounds per square inch, or higher, can satisfactorily be employed. The preferred pressure range is from about 20,000 pounds per square inch to about 100,000 pounds per square inch.

The polymerization temperature can vary broadly in the range of from about −80° C., or slightly lower, to about +100° C., or slightly higher, with temperatures of from about −10° C. to about +70° C. being preferred. A balance of pressure and temperature must be achieved to prevent decomposition, as is well known in the art among those skilled in high pressure polymerization reactions, with especially good results being realizable using higher pressures in conjunction with low temperatures within the aforementioned ranges. As is also recognized by those skilled in the art of polymerization reactions, the temperature to be employed may also depend in part upon the particular polymerization catalyst used. Thus, for instance, somewhat lower polymerization temperatures of from about −10° C. to about 30° C. are more preferably employed in conjunction with the use of trialkylboron catalysts as compared with the more preferred use of polymerization temperatures of from about 30° C. to about 70° C. in conjunction with the use of peroxidic catalysts.

The polymerization process of this invention can be carried out continuously in a tubular reactor, semi-continuously or batchwise, with or without a diluent such as toluene, benzene, heptane, etc. In any event, vigorous agitation and good cooling should be employed, particularly in bulk- or large-scale operations, so as to provide for the rapid removal of the heat of polymerization. Upon carrying out the polymerization for a period of time sufficient to produce a solid poly(allyl chloride) product, which period can vary from as little as about 1 hour or less, up to three or more days, if desired, the resulting polymer can be recovered by any convenient means such as by precipitation, filtration, evaporation, etc.

In similar manner, allyl chloride can also be polymerized with minor amounts of other monomers which are copolymerizable therewith, such as vinyl- and other allyl monomers, to form solid, high-molecular weight copolymeric products.

The following examples further serve to define and illustrate the invention, and are not to be construed as limitative thereof. In the examples, the term "glass-transition" temperature, where employed, is meant to define the softening point of the polymer, and was determined from the stiffness modulus of the polymer in the following manner. A polymer strip measuring 2 inches long, ⅛ inch wide and 0.01 to 0.02 inch thick was prepared and subsequently stretched in an Instron tester at a rate of 10 percent of the strip length per minute to a total extension of 1 percent. The stiffness modulus of the polymer is taken as 100 times the force required to stretch the polymer strip to an extent of 1 percent. Stiffness modulus values were thus measured at a series of temperatures and the values then plotted graphically against the temperatures at which the values were obtained. The first sharp drop in the stiffness modulus of the polymer with increasing temperature, as indicated by an abrupt change in the slope of the graph, is associated with and determinative of the glass-transition temperature or softening point of the polymer.

*Example I*

A 10-milliliter static tube reactor 8 inches long and having an inner diameter of 5/16 inch was charged under a nitrogen atmosphere with 0.2 gram of isopropyl percarbonate and filled with approximately 10 milliliters of cold allyl chloride at a temperature of −30° C. The charge was compressed to 100,800 pounds per square inch and maintained at this pressure by the injection of additional allyl chloride, and at a temperature of between 25° C and 33° C., for a period of 20 hours. Conducted in this manner, the ensuing polymerization reaction produced 2.83 grams of a solid homopolymer of allyl chloride. Physical studies showed the poly(allyl chloride) product to be an amorphous, elastomeric polymer having a relative viscosity of 1.02 and a glass-transition temperature of 23° C.

A 0.3-gram sample of the polymer was molded at a temperature of 45° C. and at a pressure of 1,000 pounds per square inch using a Buehler hydraulic press to produce a clear flexible plaque having a thickness of between 11.6 and 12.0 mils. The plaque was found to be non-sticky, elastomeric and non-flammable.

*Example II*

To the reactor and in the manner described in Example I, there were charged 0.05 gram of isopropyl percarbonate, 9 milliliters of allyl chloride and 1 milliliter of toluene at a temperature of −10° C. The charge was compressed to 49,800 pounds per square inch and maintained at this pressure by the injection of additional allyl chloride, and at room temperature, for a period of 13.5 hours. At the end of this period, the resulting polymer was separated from the toluene and unreacted monomer present by dissolving the product in acetone, filtering the resulting solution and evaporating the filtrate to dryness. In this manner, there were recovered 1.46 grams of a solid homopolymer of allyl chloride having a relative viscosity of 1.07.

*Example III*

To the reactor and in the manner described in Example I, there were charged 0.05 grams of azobisisobutyronitrile and 10 milliliters of allyl chloride at room temperature. The charge was compressed to 28,000 pounds per square inch and maintained at this pressure by the injection of additional allyl chloride, and at a temperature of 70° C., for a period of 13 hours. The polymerization reaction produced 0.0423 gram of a solid homopolymer of allyl chloride having a relative viscosity of 1.02.

*Example IV*

To the reactor and in the manner described in Example I, there were charged 0.2 milliliter of a 50 percent by weight solution of tributylboron in isooctane, and 10 milliliters of allyl chloride, at a temperature of −10° C. The charge was compressed to 25,200 pounds per square inch and maintained at this pressure by the injection of additional allyl chloride, and at a temperature of −4°

C., for a period of 12 hours. In this manner, there was produced 0.206 gram of a solid homopolymer of allyl chloride having a relative viscosity of 1.05.

*Example V*

To the reactor and in the manner described in Example I, there were charged 0.2 milliliter of a 25 percent by weight solution of acetyl peroxide in dimethyl phthalate, and 10 milliliters of allyl chloride, at a temperature of −10° C. The charge was compressed to 28,800 pounds per square inch and maintained at this pressure by the injection of additional allyl chloride, and at room temperature, for a period of 70 hours. The polymerization reaction produced 0.212 gram of a solid homopolymer of allyl chloride having a relative viscosity of 1.04.

*Example VI*

To the reactor and in the manner described in Example I, there were charged 0.05 gram of benzoyl peroxide and 10 milliliters of allyl chloride at a temperature of −10° C. The charge was compressed to 74,400 pounds per square inch and maintained at this pressure by the injection of additional allyl chloride, and at a temperature of 70° C., for a period of 13.5 hours. The polymerization reaction produced 2.68 grams of a solid homopolymer of allyl chloride having a relative viscosity of 1.05.

What is claimed is:

1. Solid homopolymers of allyl chloride having a relative viscosity in the range of from about 1.01 to about 1.2 in cyclohexanone at a temperature of 30° C. produced by contacting allyl chloride with a catalytic amount of a free-radical polymerization catalyst at a pressure of from about 15,000 pounds per square inch to about 125,000 pounds per square inch and at a temperature of from about −80° C. to about +100° C.

2. A process for the production of solid homopolymers of allyl chloride which comprises contacting allyl chloride with a catalytic amount of free-radical polymerization catalyst at a pressure of from about 15,000 pounds per square inch to about 125,000 pounds per square inch and at a temperature of from about −80° C. to about +100° C.

3. A process for the production of solid homopolymers of allyl chloride which comprises contacting allyl chloride with a catalytic amount of free-radical polymerization catalyst at a pressure of from about 20,000 pounds per square inch to about 100,000 pounds per square inch and at a temperature of from about −10° C. to about +70° C.

4. The process according to claim 3 wherein the catalyst is isopropyl percarbonate.

5. The process according to claim 3 wherein the catalyst is azobisisobutyronitrile.

6. The process according to claim 3 wherein the catalyst is tributylboron.

7. The process according to claim 3 wherein the catalyst is acetyl peroxide.

8. The process according to claim 3 wherein the catalyst is benzoyl peroxide.

References Cited by the Examiner

UNITED STATES PATENTS

| | | | |
|---|---|---|---|
| 2,263,654 | 11/1941 | Sparks et al. | 260—91.7 |
| 2,331,869 | 10/1943 | Adelson et al. | 260—91.7 |
| 2,426,913 | 9/1947 | Adelson et al. | 260—91.7 |

OTHER REFERENCES

Bulletin Chemical Society of Japan 34, pp. 631–5 (1961).

JOSEPH L. SCHOFER, *Primary Examiner.*

W. N. BURNSTEIN, WILLIAM H. SHORT, *Examiners.*